UNITED STATES PATENT OFFICE.

ARTHUR WEINBERG AND FELIX KLINGEMANN, OF FRANKFORT-ON-THE-MAIN, GERMANY, ASSIGNORS TO LEOPOLD CASSELLA & CO., OF FRANKFORT-ON-THE-MAIN, GERMANY.

BLUE DYE AND PROCESS OF MAKING SAME.

SPECIFICATION forming part of Letters Patent No. 709,186, dated September 16, 1902.

Application filed December 31, 1901. Serial No. 87,957. (Specimens.)

*To all whom it may concern:*

Be it known that we, ARTHUR WEINBERG and FELIX KLINGEMANN, citizens of Prussia, and residents of Frankfort-on-the Main, in the Province of Hesse-Nassau and Kingdom of Prussia, Germany, have invented certain new and useful Improvements in Blue Dyestuffs and Processes of Making Same, of which the following is a specification.

Our invention relates to an improvement in the production of direct dyeing cotton dyestuffs. We have found that a blue color of an extreme fastness to light is obtained by first combining three molecules of 1.6 or 1.7 naphtylamin sulfo-acid (which are generally designated as "Cleve" acids) to a new substance of the constitution.

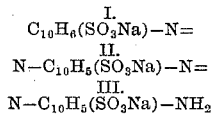

diazotizing this compound and finally combining with 2.5 amidonaphtol 7 sulfonic acid. If the hydrogen in the molecule I of the formula given above, which is in position 1:4 to the amido or diazo group, is substituted by acetamido or amido, the character of the dyestuff is not very essentially altered.

The following examples illustrate how this invention may be carried into effect:

Example 1: 24.5 kilos of the sodium salt of the naphtylamin sulfo-acid 1.6 or 1.7 (Cleve acid) are diazotized at 5° centigrade with 34.5 kilos hydrochloric acid and 6.9 kilos nitrite of sodium. The resulting diazo solution is allowed to run into a solution of 24.5 kilos sodium salt of the Cleve acid cooled to 0° centigrade. After twelve hours it is further diazotized at 0° centigrade with twenty-three kilos hydrochloric acid and 6.9 kilos nitrite of sodium. After an hour the diazo solution is introduced into a solution containing 24.5 kilos of the sodium salt of Cleve acid and twenty-eight kilos sodium acetate. After twelve hours the intermediate substance (consisting of three molecules of Cleve acid) is separated by addition of common salt. It is then filtered off and dissolved in boiling water. To the cooled solution fifty kilos hydrochloric acid are added and 6.9 kilos nitrite of soda at a temperature of about 0° centigrade. After some hours the diazo compound is brought into a solution of 26.1 kilos of 2 amido 5 naphtol 7 sulfonate of soda, containing, besides, fifty kilos carbonate of soda. As soon as the formation of the blue dyestuff is completed the solution is heated to 85° centigrade and the dyestuffs precipitated by means of common salt.

Example 2: Twenty-eight kilos 1.4 amido acetnaphtalid 7 sulfo-acid are diazotized with seven kilos nitrite of soda and thirty-six kilos hydrochloric acid. The diazo compound is combined with 22.3 kilos Cleve acid in the presence of an excess of acetate of soda. After about two hours the easily-soluble brown monoazo dyestuff is formed. It is then acidulated with hydrochloric acid and diazotized again by adding seven kilos nitrite of soda. The resulting diazo compound is allowed to run into the solution of 22.3 kilos Cleve acid in the presence of a sufficient quantity of sodium acetate to neutralize the free mineral acid. The thus-formed violet dyestuff is easily soluble, and it is best to use its solution directly for the further diazotizing, which is done by acidulating with hydrochloric acid and introducing seven kilos nitrite of soda. The diazo compound is brought into the solution of 23.9 kilos 2 amido 5 naphtol 7 sulfonic acid, rendered alkaline by means of carbonate of soda. The blue dyestuff is finally salted out and dried, or the acetyl group may be saponified by boiling the solution for about half an hour with soda-lye of five per cent. The excess of lye is then finally neutralized with an acid and the dyestuff precipitated with common salt.

The thus-produced dyestuffs show the following properties: In the dry state they represent dark powders of a metallic luster. They are soluble in water, with a blue color. From the aqueous solution hydrochloric acid precipitates the acid of the coloring-matter in shape of blue flakes. Acetic acid does not precipitate the coloring-matter. The solution of the new dyes in concentrated sulfuric acid shows a blackish-blue color. On addition of water the coloring-matter is precipitated in form of violet flakes. They produce on unmordanted cotton indigo-blue shades of a remarkable fastness to light.

Having now described our invention and in what manner it may be carried out, what we claim is—

1. The process of producing blue cotton dyestuffs of the herein-described constitution which consists in diazotizing one molecule of amido acetnaphtalid sulfo-acid, combining successively with two molecules of Cleve acid, diazotizing again and finally combining with one molecule of 2 amido 5 naphtol 7 sulfonic acid substantially as described.

2. The blue cotton dyestuff of the constitution mentioned above which is a dark-blue or bronzy powder easily soluble in water with a bright blue color, being precipitated by addition of hydrochloric acid, dissolving with a blackish-blue shade in concentrated sulfuric acid, separating from such solution by addition of water and dyeing unmordanted cotton indigo-blue shades fast to light substantially as described.

Signed at Frankfort-on-the-Main, in the Province of Hesse-Nassau, Kingdom of Prussia, this 11th day of December, A. D. 1901.

ARTHUR WEINBERG.
FELIX KLINGEMANN.

Witnesses:
JEAN GRUND,
CARL GRUND.